United States Patent
Bernardo et al.

(10) Patent No.: US 12,359,540 B2
(45) Date of Patent: Jul. 15, 2025

(54) OVERPRESSURE VALVE SYSTEM FOR A SUBSEA MANIFOLD

(71) Applicant: FMC Technologies, Inc., Houston, TX (US)

(72) Inventors: Leonardo de Araujo Bernardo, Dunfermline (GB); Chung Yong Lim, Singapore (SG); John Calder, Gremp Campus, TX (US); Andre Faisca, Rio de Janeiro (BR)

(73) Assignee: FMC Technologies, Inc., Houston, TX (US)

( * ) Notice: Subject to any disclaimer, the term of this patent is extended or adjusted under 35 U.S.C. 154(b) by 38 days.

(21) Appl. No.: 18/514,246

(22) Filed: Nov. 20, 2023

(65) Prior Publication Data

US 2025/0164023 A1    May 22, 2025

(51) Int. Cl.
| | |
|---|---|
| *F16K 27/00* | (2006.01) |
| *E21B 43/013* | (2006.01) |
| *E21B 43/017* | (2006.01) |
| *F16K 3/02* | (2006.01) |
| *F16K 27/04* | (2006.01) |
| *F16K 37/00* | (2006.01) |

(52) U.S. Cl.
CPC ......... *E21B 43/017* (2013.01); *E21B 43/013* (2013.01); *F16K 3/0209* (2013.01); *F16K 27/003* (2013.01); *F16K 27/044* (2013.01); *F16K 37/005* (2013.01); *F16K 2200/401* (2021.08); *F16K 2200/402* (2021.08)

(58) Field of Classification Search
CPC ...... F16K 17/025; F16K 3/32; F16K 15/1843; F16K 15/184; F16K 25/02; F16K 2200/401; F16K 2200/402; F16K 3/0209; F16K 27/003; F16K 27/044; F16K 37/005; E21B 43/01; E21B 43/013; E21B 43/017

See application file for complete search history.

(56) References Cited

U.S. PATENT DOCUMENTS

| | | | | |
|---|---|---|---|---|
| 4,393,889 A | * | 7/1983 | Binegar | F16K 3/186 137/72 |
| 4,515,174 A | * | 5/1985 | Hollister | F16K 3/186 137/72 |
| 2011/0308619 A1 | * | 12/2011 | Martino | F16K 3/0254 251/65 |
| 2022/0042615 A1 | * | 2/2022 | Moseley | F16K 25/02 |

FOREIGN PATENT DOCUMENTS

| | | |
|---|---|---|
| CN | 215214819 U | 12/2021 |
| WO | 2020070266 A1 | 4/2020 |

OTHER PUBLICATIONS

PCT Patent Application PCT/US24/43805 International Search Report and Written Opinion of the International Searching Authority issued Nov. 28, 2024.

\* cited by examiner

*Primary Examiner* — Marina A Tietjen
(74) *Attorney, Agent, or Firm* — Erise IP, P.A.

(57) ABSTRACT

Systems, methods, and devices for relieving overpressure associated with thermal expansion of fluid within a closed cavity of a subsea manifold assembly. The subsea manifold assembly may comprise a header bore fluidly connected to one or more branch connections. A unidirectional valve is included at the branch connections to allow fluid leakage from the closed cavity into a header bore of the subsea manifold assembly to thereby reduce a pressure within the cavity while in the closed position.

19 Claims, 4 Drawing Sheets

OVERPRESSURE VALVE SYSTEM FOR A SUBSEA MANIFOLD

BACKGROUND

1. Field

Embodiments of the present disclosure relate to manifold valve assemblies. More specifically, embodiments of the present disclosure relate to overpressure valve assemblies for a subsea manifold.

2. Related Art

Block manifolds may be used in subsea systems in place of pipe manifolds. However, block manifolds are more rigid and, therefore, not as well suited for thermal expansion of fluid disposed therein. Accordingly, high pressures associated with thermal expansion of fluid within the block manifold may rise above a pressure rating of sensitive components within the manifold. These sensitive components include valves, sensors, pumps, caps, and other devices. For example, in some cases, a cavity associated with the manifold may be capped off such that a pressure inside of the cavity builds up and cannot be released. An overpressure associated with the cavity may result in premature failure and wear of valves, pumps, caps, and other sensitive components of the manifold system.

SUMMARY

Embodiments of the present disclosure solve the above-mentioned problems by providing systems, methods, and devices for relieving an overpressure associated with a closed volume of a subsea manifold. In some embodiments, a unidirectional gate valve is used that allows fluid leakage in one direction to relieve overpressure from the closed volume.

In some aspects, the techniques described herein relate to an overpressure assembly for a subsea manifold, the overpressure assembly including: a first fluid connection coupled to a manifold header of the subsea manifold; a second fluid connection coupled to a cavity associated with the subsea manifold; and a unidirectional gate valve disposed between the first fluid connection and the second fluid connection, the unidirectional gate valve configurable between an open position in which fluid is permitted to flow freely between the manifold header and the cavity and a closed position in which fluid is prevented from flowing to the cavity.

In some aspects, the techniques described herein relate to a block manifold assembly including: a manifold header including a header bore; a plurality of branch connections selectively fluidly connected to the header bore; a plurality of valves disposed respectively at the plurality of branch connections. At least one of the plurality of valves includes a unidirectional gate valve, the unidirectional gate valve including: a gate configurable between a closed position and an open position; a first valve seat disposed between the gate and the manifold header, the first valve seat including: a leakage opening that permits fluid leakage from a cavity associated with the respective branch connection to the manifold header when the gate is in the closed position; and a second valve seat disposed between the gate and the respective branch connection, wherein the second valve seat seals against the gate when the gate is in the closed position.

In some aspects, the techniques described herein relate to a unidirectional gate valve assembly for a subsea manifold. The unidirectional gate valve assembly includes: a gate configurable between a closed position and an open position; a first valve seat disposed between the gate and a connection to a manifold header of the subsea manifold, wherein the first valve seat includes at least one leakage opening that permits fluid leakage from a cavity associated with a branch connection to the manifold header when the gate is in the closed position; and a second valve seat disposed between the gate and the branch connection, wherein the second valve seat seals against the gate when the gate is in the closed position.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1:
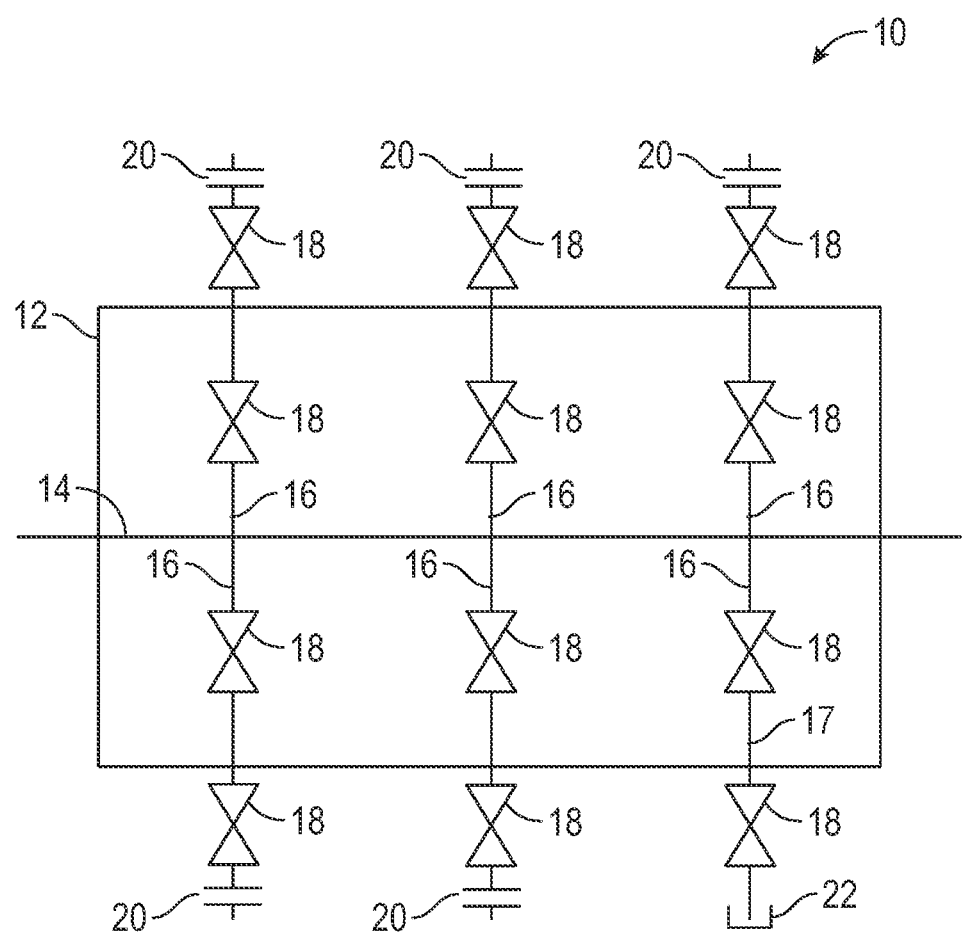
FIG. 1 illustrates an exemplary diagram of a subsea manifold system relating to some embodiments of the present disclosure.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments but is not necessarily included. Thus, the technology can include a variety of combinations and/or integrations of the embodiments described herein.

Embodiments of the present disclosure relate to a manifold system, overpressure system, and unidirectional gate valve assembly for reducing overpressure associated with a subsea manifold system. Subsea manifold systems may include a block or pipe manifold including a header bore fluidly connected to a plurality of branch connections. In some cases, one or more of the branch connections may be closed off at least temporarily. For example, a branch connection may be capped off while not in use, creating a trapped volume within a cavity of the branch connection. Heat produced by one or more active branch connections, or within the header bore, may be transferred to the trapped volume, resulting in thermal expansion within the cavity. The thermal expansion causes the pressure within the cavity to increase and may result in overpressure that exceeds a pressure rating of one or more components associated with the respective branch connection. In some cases, pressure changes attributed to thermal expansion range from about 5 kilo-pounds per square inch to about 15 kilo-pounds per square inch. Accordingly, embodiments of the present disclosure seek to provide a mechanism and/or device for relieving the pressure within the cavity. For example, a unidirectional gate valve may be disposed at the branch connection that permits fluid leakage into the header bore to relieve the overpressure caused by the thermal expansion.

Overpressure within a closed cavity is especially relevant for block manifolds because of the limited thermal expansion associated with the rigidity of the block manifold. However, it should be understood that a similar problem may be present in pipe manifolds. Accordingly, embodiments of the present disclosure are contemplated for any form of manifold system.

FIG. 1 illustrates an exemplary diagram of a subsea manifold system 10 relating to some embodiments of the present disclosure. For example, the subsea manifold system 10 may be used for subsea drilling operations, such as subsea oil production and other marine and offshore operations.

The subsea manifold system 10 includes a block manifold 12, as shown. The block manifold 12 may include a header bore 14 including a bore extending at least a portion of a length of the block manifold 12. In some embodiments, the header bore 14 is fluidly connected to a plurality of branch connections 16. The branch connections 16 may be connected perpendicular to the length of the header bore 14, as shown. The branch connections 16 may be coupled to a 'Christmas tree' assembly including a plurality of subsea piping and tubing structures. Further, in some embodiments, the branch connections 16 may be associated with one or more crossover conduits of the subsea manifold system 10 that are fluidly connected substantially perpendicularly to the header bore 14.

In some embodiments, a fluid connection between the header bore 14, and the plurality of branch connections 16 may be selectively opened, closed, and/or throttled using a respective valve 18 of a plurality of valves included in the manifold system 10. Each valve 18 may include a gate valve or another suitable valve configured to selectively block the flow of fluid within the respective branch connection 16. In some embodiments, at least one of the plurality of valves 18 includes a bidirectional gate valve configured to block flow in both directions, i.e., from the branch connection 16 to the manifold header bore 14 and vice versa. In some embodiments, at least one respective valve 18 of the plurality of valves includes a dual gate valve including a pair of closable gates (or disks) configured to selectively block flow through the respective tree connection. Further, in some embodiments, multiple gate valves may be included at each branch connection 16. For example, a first gate valve may be disposed at the connection with the block manifold 12 while a second gate valve is disposed at an opposite end of the crossover conduit.

The subsea manifold system 10, as shown, includes six branch connections 16. However, it should be understood that embodiments are contemplated with any number of branch connections 16, such as, for example, a single branch connection, two branch connections, four branch connections, or a greater number of branch connections. Further, in embodiments, the branch connections 16 may be arranged perpendicularly to the header bore 14, as shown. However, embodiments are contemplated in which one or more of the branch connections 16 are arranged and connected to the manifold block 12 at a different angle relative to the header bore 14. For example, in some embodiments, the branch connections 16 are attached at a 30-degree angle, a 45-degree angle, or another suitable angle to the length of the header bore 14. Further still, in some embodiments, at least one of the branch connections 16 is aligned or substantially aligned with the flow through the header bore 14.

In some embodiments, at least a portion of the plurality of branch connections 16 are coupled to a production line 20 by which a production fluid or other fluid travels into the header bore 14. Alternatively, or additionally, one or more of the branch connections 16 may be capped off using at least one cap 22, as shown. The cap 22 may be disposed on an end of a respective branch connection 16 to disengage the respective branch connection 16. In some embodiments, one or more of the branch connections 16 may be disconnected or closed at least temporarily using any combination of the cap 22 or the valves 18. For example, flow from a particular branch connection 16 may be closed to perform maintenance operations or while the branch connection is not productive. Further, in some embodiments, a larger number of branch connections 16 may be included than lines that are actually producing. Accordingly, it may be desirable to shut off flow at one or more redundant branch connections while not in use.

In some embodiments, the cap 22 may include a metal-to-metal contact interface with a crushed gasket to provide a pressure seal within the closed cavity of the respective branch connection 16. Alternatively, in some embodiments, the cap 22 may include an elastomeric cap or a temporary short-term cap. For example, a temporary cap may be used to perform maintenance routines or repairs on the subsea manifold system 10. Further still, in some embodiments, multiple caps 22 may be included on a single branch connection 16 or a combination of caps and external valves to provide redundancy to ensure that the closed cavity remains closed. For example, in some embodiments, an external valve is disposed on an end of at least one branch connection to selectively close a cavity of the at least one branch connection.

In some embodiments, flow through the branch connections 16 may be optionally shutoff using the one or more valves 18 disposed at each interface of the branch connection 16 with the header bore 14. In some embodiments, the valves 18 may include gate valves configured to seal and block flow in at least one direction through the branch connection 16. For example, in some embodiments, at least one of the valves includes a bidirectional gate valve configured to prevent fluid flow and provide a pressure seal to prevent fluid from traveling from the header bore 14 to the branch connection 16, as well as from the branch connection 16 to the header bore 14. In some embodiments, the fluid described herein may include any suitable fluid, such as, for example, a production fluid, water, cleaning or maintenance fluid, an unknown fluid, or another incompressible fluid not explicitly described herein.

In some embodiments, at least one of the valves 18 includes a unidirectional gate valve configured to block flow and provide a pressure seal in a singular direction. For example, the unidirectional gate valve may be configured to prevent flow from the header bore 14 to the branch connection 16, but permit leakage of a volume of fluid from the branch connection 16 to the header bore 14, thereby alleviating overpressure associated with a trapped volume of fluid in the branch connection 16 or crossover conduit associated therewith. In embodiments as discussed below, the leaked volume of fluid is a predefined or defined volume based on parameters or characteristics of the fluid or the block manifold, such as a temperature or pressure of the fluid or a temperature of the block manifold. Further, in some embodiments, a volumetric flow rate of leakage through the unidirectional gate valve may be controlled based on parameters of fluid or temperature associated with the block manifold or branch connection 16. For example, a predetermined volumetric flow rate of fluid leakage may be allowed based on a particular pressure or temperature detected within the block manifold. In a first example, for a pressure of 3000 psi in the closed portion, a volumetric flow rate of about 50 cubic feet per hour of leakage is allowed. In a second example, for a pressure of 4000 psi in the closed portion, a volumetric flow rate of about 100 cubic feet per hour of leakage is allowed. In yet another example, for a pressure of 4000 psi in the closed portion, a volumetric flow rate of about 150 cubic feet per hour of leakage is allowed. It should be understood that the above-mentioned examples are just a few examples of volumetric flow rates and that a variety of other volumetric flow rates not explicitly described herein are also contemplated.

In some embodiments, the subsea manifold system 10 includes any of a number of additional components such as, for example, pumps, redundant valves, redundant caps, additional fluid connections, pumps, as well as other manifold components not explicitly described herein. In some embodiments, one or more temperature sensors may be disposed within the subsea manifold system 10 configured to detect a temperature associated with the block manifold 12. In some such embodiments, a level of thermal expansion of the fluid within the closed cavity or associated components of the block manifold may be estimated based, at least in part, on the temperature detected by the one or more temperature sensors.

The overpressure discussed above may be generated based on heat present in a production stream of the header bore 14. For example, hot production oil may be received from one or more active branch connections 16. Heat transfer through the block manifold 12 raises the temperature of fluid within the closed cavity of the capped off branch connection, leading to thermal expansion. The thermal expansion of the fluid within the closed cavity produces an overpressure therein. Accordingly, embodiments of the present disclosure provide a means for unidirectional fluid leakage to relieve the overpressure within the closed cavity and prevent sensitive components from being operated above their intended operation pressure ratings.

Figure 2:
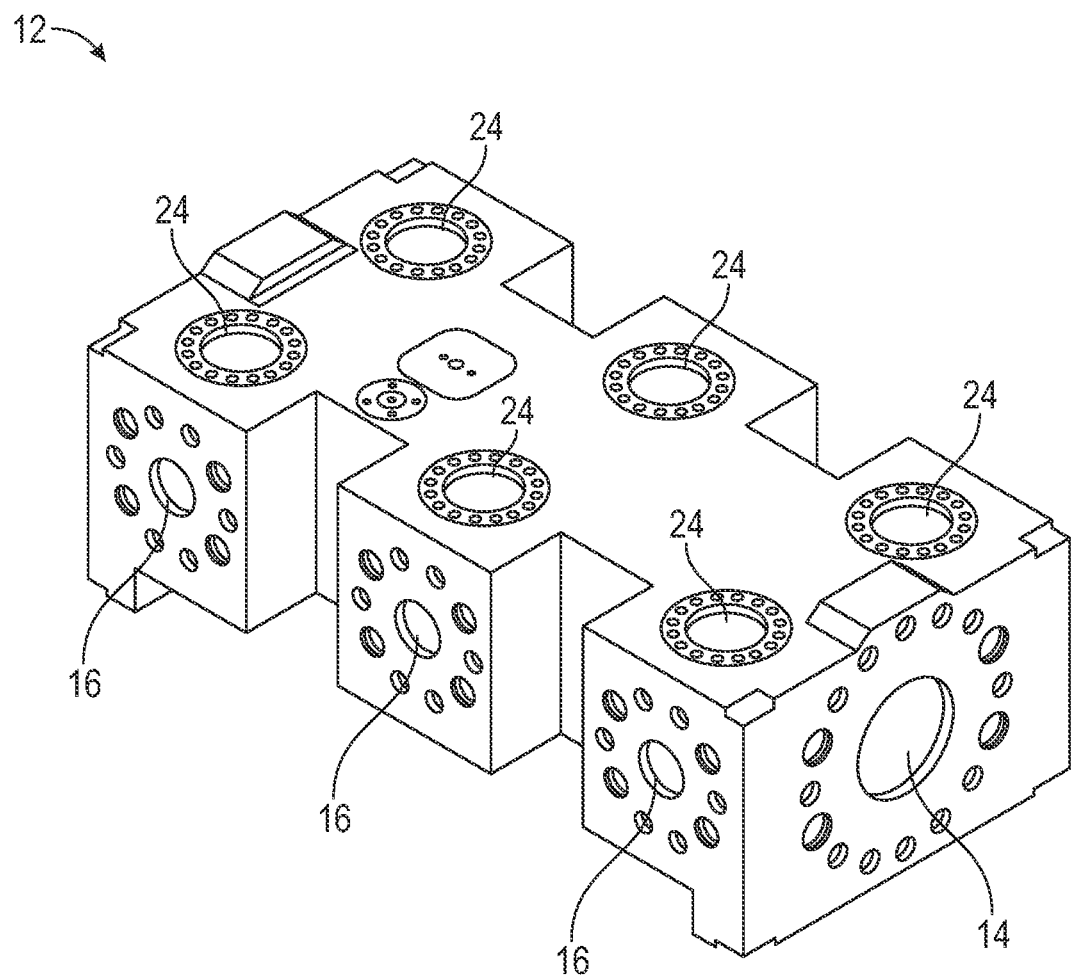
FIG. 2 illustrates an exemplary view of the block manifold relating to some embodiments of the present disclosure.

FIG. 2 illustrates an exemplary view of the block manifold 12, in accordance with embodiments of the present disclosure. In some embodiments, the block manifold 12 may be machined from a metal material such as steel, stainless steel, aluminum, titanium, or another suitable rigid material. Further, any combination of additive or subtractive manufacturing methods are contemplated for providing the block manifold 12. Similar to as described above, the block manifold 12 includes the header bore 14 extending through a length of the block manifold 12, as shown. Further, the block manifold 12 includes a plurality of valve openings 24, including bored holes for receiving the respective plurality of valves 18.

In some embodiments, the block manifold 12 may be configured to interface with a plurality of fasteners for connecting tree components and valves. For example, a plurality of holes may be machined in the block manifold 12 to receive fasteners such as bolts or other suitable fasteners to connect other components to the block manifold 12. In some embodiments, the fastener holes may be disposed circumferentially around the bore of each valve opening 24 and branch connection 16.

In some embodiments, the block manifold 12 further includes one or more openings or compartments for receiving one or more sensors or control components. For example, a slot or cutaway portion may be included on a top surface of the block manifold 12 to receive a control device or sensor assembly.

Figure 3A:
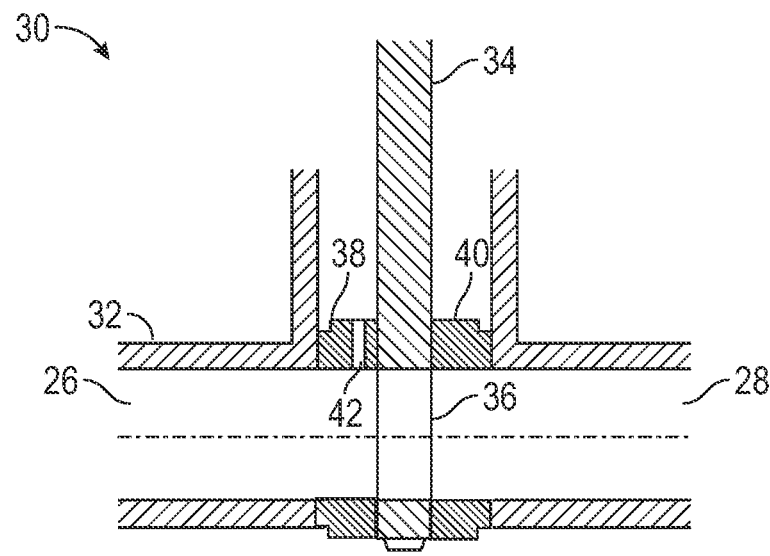
FIG. 3A illustrates an exemplary unidirectional gate valve assembly in an open position relating to some embodiments of the present disclosure.

FIG. 3A illustrates an exemplary unidirectional gate valve assembly 30 in an open position relating to some embodiments of the present disclosure. In some embodiments, the unidirectional gate valve assembly 30 is disposed within the manifold system 10 at or proximate to a respective branch connection 16, as described above. For example, the unidirectional gate valve assembly 30 may be disposed within a manifold structure 32 of the block manifold 12. Further, in some embodiments, the unidirectional gate valve assembly 30 is disposed in a valve opening 24 of the block manifold 12. In some embodiments, the unidirectional gate valve assembly 30 is disposed between a first fluid connection 26 coupled to the manifold header bore 14 and a second fluid connection 28 coupled to a cavity of a respective branch assembly.

In some embodiments, the unidirectional gate valve assembly 30 includes a gate 34 configurable between an opened position and a closed position. For example, in some embodiments, the gate 34 includes a gate opening 36 disposed parallel to a flow path of the branch bore of the branch connection 16, as shown, configured to allow fluid to pass through the gate 34. When in the open position, the gate opening 36 is aligned with the branch bore such that fluid is able to flow freely through the branch connection 26. In some embodiments, the gate 34 is lifted into the open position to align the gate opening 36. Alternatively, in some embodiments, the gate 34 may be lowered into the open position to align the gate opening 36. In some embodiments, the unidirectional gate valve assembly 30 includes a plurality of gates. For example, the unidirectional gate valve assembly 30 may include a dual gate valve, including a first gate and a second gate.

In some embodiments, the unidirectional gate valve assembly 30 includes one or more valve seats. For example, the unidirectional gate valve assembly 30 may include a first valve seat 38 that may be disposed adjacent to the gate 34 on a side of the first fluid connection 26 and a second valve seat 40 disposed adjacent to the gate 34 on a side of the second fluid connection 28. In some embodiments, the valve seats 38 and 40 include seat rings with an internal circular opening configured to concentrically align with the central bore of the branch connection 16, as shown. For example, the seat ring may be configured to be placed along the bore of the branch connection 16 surrounding the circumference of the bore.

In some embodiments, a leakage opening 42 is included within one of the first valve seats 38 and the second valve seat 40. The leakage opening 42 permits fluid leakage from the cavity of the branch connection to the header bore 14, i.e., from the second fluid connection 28 to the first fluid connection 26.

Figure 3B:
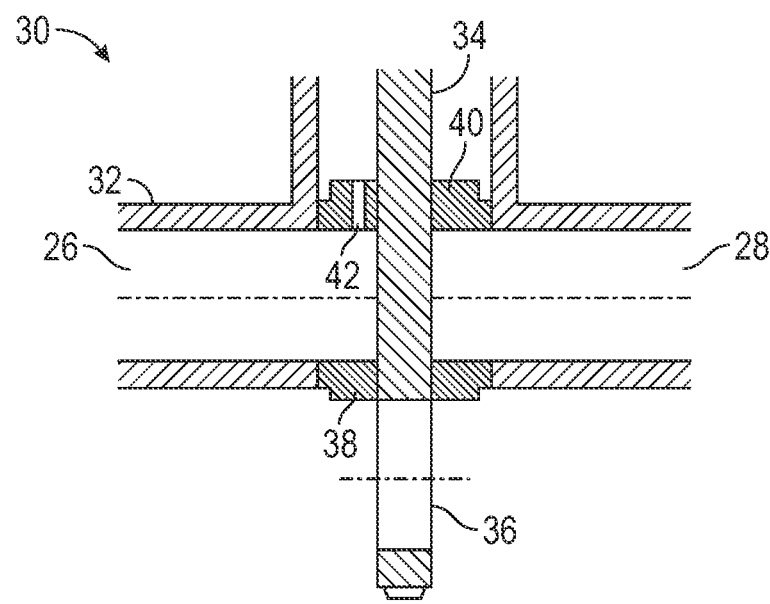
FIG. 3B illustrates the exemplary unidirectional gate valve assembly in a closed position relating to some embodiments of the present disclosure.

FIG. 3B illustrates the exemplary unidirectional gate valve assembly 30 in a closed position relating to some embodiments of the present disclosure. In some embodiments, the unidirectional gate valve assembly 30 may be configured to switch between the open position and the closed position responsive to either a manual or automatic input. For example, in some embodiments, a threading may be included on at least a portion of the gate 34 such that the gate 34 may be raised and lowered responsive to the rotation of the gate 34. Accordingly, a motor may be included for driving rotation of the gate 34. Alternatively, in some embodiments, the gate 34 may be rotated manually by an operator using a lever or valve handle coupled to the gate 34.

In some embodiments, while in the closed position, the gate 34 is configured to seal against at least one of the valve seats 38 and 40. For example, embodiments are contemplated in which a pressure is higher on the side of the first fluid connection 26 causing the gate 34 to be pushed against the second valve seat 40 to thereby provide a pressure seal to prevent fluid flow through the unidirectional gate valve assembly 30. Similarly, when the pressure is higher on the side of the second fluid connection 28 the gate 34 may be pushed against the first valve seat 38. However, the leakage opening 42 prevents a complete seal and allows fluid to leak from the branch connection 16 to the header bore 14 when the pressure is higher at the branch connection 16. Accordingly, pressure is relieved for a closed volume cavity associated with the branch connection 16.

It should be understood that other forms of pressure relief are contemplated for allowing fluid leakage from the closed cavity of the branch connection 16. For example, in some embodiments, a separate one-way valve, such as a check valve, may be disposed within the gate 34 or the valve seat 38 to allow flow in a single direction when the gate 34 is in the closed position. Alternatively, or additionally, in some embodiments, a combination of multiple pressure relief mechanisms may be included, for example, a plurality of leakage openings, a plurality of check valves, or a combination of leakage openings and check valves. Further, embodiments are contemplated in which a check valve is disposed inside of the leakage opening 42 to prevent back flow.

Embodiments are described above relating to block manifold systems. However, it should also be understood that embodiments are contemplated for use in pipe manifold systems. Specifically, even though pipe manifolds may be better suited for thermal expansion of fluid disposed therein due to the length and structural flexibility of the pipes, pipe manifolds may experience a similar issue associated with the overpressure of a trapped volume. Accordingly, a similar unidirectional gate valve solution is contemplated for use in a pipe manifold system. Further, in some embodiments, overpressure relief systems are contemplated for combination block pipe manifold systems, which include some form of combination of blocks and pipes to form a manifold structure.

In some embodiments, the unidirectional gate valve assembly 30 is configured to allow fluid leakage responsive to a pressure in the closed volume cavity exceeding a pressure threshold. Here, the unidirectional gate valve assembly 30 may be configured to passively switch into a leakage position responsive to the pressure within the cavity. For example, a portion of the unidirectional gate valve assembly 30 may be configured to translate responsive to the pressure such that the leakage opening 42 is accessible or aligned. Conversely, the unidirectional gate valve assembly 30 may be biased into a blocked position when the pressure in the cavity is below a particular threshold such that the leakage opening 42 is blocked. Alternatively, in some embodiments, the unidirectional gate valve assembly 30 may be configured to allow fluid leakage actively. For example, any combination of pressure sensors, temperature sensors, and control units may be included to actively block or open the leakage opening 42 based on a measured parameter. In one exemplary control configuration, a hydraulic actuator is included to selectively block or open the leakage opening 42 responsive to a signal detected by at least one sensor. Alternatively, in some embodiments, other forms of actuators are contemplated for actively opening and closing the leakage opening 42. For example, any one of an electrical piston, a hydraulic piston, or another suitable form of mechanically, magnetically, or electrically actuated device.

Further, in some embodiments, one or more flow sensors may be disposed within the unidirectional gate valve assembly 30. The flow sensors may be configured to measure a volume or volumetric flow of fluid that is leaked through the leakage opening 42. In some embodiments, control of the unidirectional gate valve assembly 30 may be adjusted based at least in part on the measured volume of volumetric flow rate of fluid leakage. For example, the leakage opening 42 may be selectively closed based on a volume of leaked fluid exceeding a predetermined leakage volume threshold.

Figure 4:
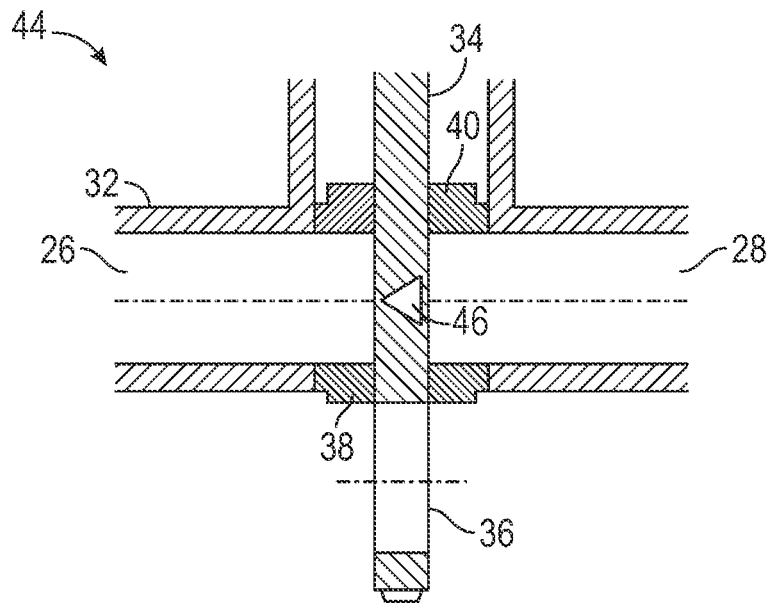
FIG. 4 illustrates another exemplary unidirectional gate valve assembly relating to some embodiments of the present disclosure.

FIG. 4 illustrates another exemplary unidirectional gate valve assembly 44 relating to some embodiments of the present disclosure. The exemplary unidirectional gate valve assembly 44 is disposed between the first fluid connection 26 and the second fluid connection 28 and includes the manifold structure 32, the gate 34, the gate opening 36, the first valve seat 38, and the second valve seat 40, as described above with respect to the unidirectional gate valve assembly 30.

In some embodiments, the unidirectional gate valve assembly 44 further includes a check valve 46 disposed within the gate 34. The check valve 46 only allows flow in a singular direction and is thereby configured to allow fluid leakage from the side of the second fluid connection 28 through the gate 34 and into the first fluid connection 26 but prevents flow in the reverse direction. Alternatively, embodiments are contemplated in which the check valve 46 or an additional check valve is disposed within a portion of the valve seat 38.

The check valve 46 may include any suitable form of one-way valve such as a swing valve, nozzle valve, ball valve, diaphragm valve, stop valve, or duckbill valve. Further, in some embodiments, a plurality of check valves may be included. Further still, in some embodiments, the check valve 46 may be actuatable such that the check valve 46 may be manually or automatically engaged or disengaged.

In some embodiments, the exemplary unidirectional gate valve assembly 44 is configurable between three distinct positions: a first position in which the gate 34 is opened such that the gate opening 36 is aligned with the branch bore, a second position in which the gate 34 is closed but the check valve 46 is aligned with the branch bore to allow fluid leakage in a single direction, and a third position in which the gate 34 is lowered further such that the check valve 46 is not aligned with the branch bore to prevent fluid in all directions.

In some embodiments, the check valve 46 is configured to allow fluid leakage based, at least in part, on a pressure within the closed cavity. For example, the check valve 46 may allow fluid leakage when the pressure is above a predetermined pressure threshold associated with the check valve 46, such as a cracking pressure for the check valve.

Figure 5:
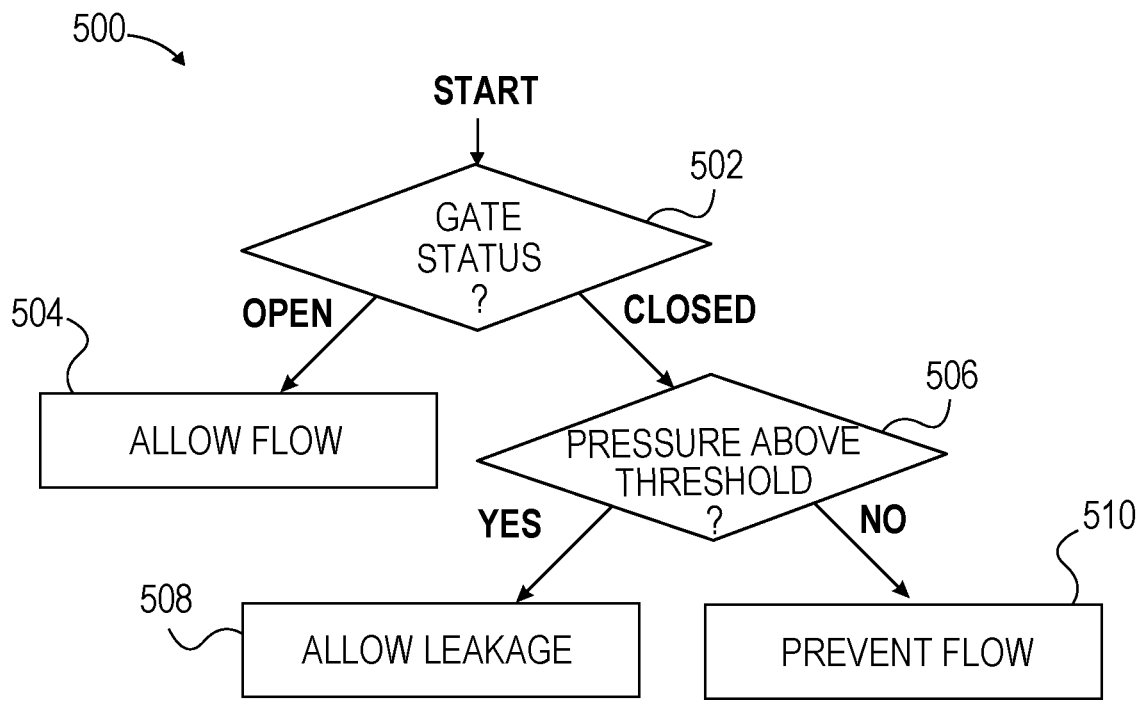
FIG. 5 illustrates an exemplary method of operation for an overpressure system relating to some embodiments of the present disclosure.

FIG. 5 illustrates an exemplary method 500 of operation for the overpressure system relating to some embodiments of the present disclosure. In some embodiments, the method 500 may be performed actively, for example, using at least one processor associated with a control unit of the manifold system. Here, the at least one processor may be programmed to execute a set of computer-executable instructions. Alternatively, in some embodiments, at least a portion of the method 500 may be performed passively using one or more passively actuated mechanical components. Further still, in some embodiments, portions of the steps may be performed manually responsive to one or more operator inputs. The method 500 may be performed with respect to any of the devices or systems described herein, such as the subsea manifold system 10, manifold block 12, the unidirectional gate valve assembly 30, or the exemplary unidirectional gate valve assembly 44.

At step 502, the current gate status is determined. In some embodiments, the gate status may be determined between one of two configurations such as an open configuration and a closed configuration. Further, in some embodiments, additional gate statuses are contemplated, for example, the gate may be opened partially based on an incremental percentage of opening to thereby adjust the flow. In some embodiments, the gate status may be determined based on an electronically updated status indication present within a control system. Alternatively, in some embodiments, the gate status may be determined using one or more sensors disposed adjacent to the gate or mechanically based on one or more actuators associated with the gate.

At step 504, if the gate is open, flow is allowed through the valve assembly. In some embodiments, the flow is allowed through the assembly by positioning the gate such that the gate opening is aligned with the branch bore of the branch connection such that the fluid flow is uninterrupted.

At step 506, if the gate is closed, a further determination is made as to whether the pressure in the cavity is above a predetermined threshold. In some embodiments, said determination may be performed passively, for example, based on a structure or mechanical component of the valve assembly or other passively operated component. If the pressure is above the predetermined threshold, leakage of fluid is allowed through the valve assembly at step 508. Conversely, if the pressure is not above the predetermined threshold, the flow is prevented at step 510. Alternatively, embodiments are contemplated in which leakage is allowed regardless of the pressure within the cavity. Further, embodiments are contemplated in which the amount of leakage may be determined based, at least in part, on the pressure within the cavity.

The embodiments described above are directed to subsea manifold systems. However, it should be understood that the systems and devices herein may be used in other forms of manifold systems, such as terrestrial or subterranean manifold systems. For example, the unidirectional gate valve described herein may be included in a terrestrial manifold system.

The following embodiments represent exemplary embodiments of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting.

Clause 1. An overpressure assembly for a subsea manifold, the overpressure assembly comprising: a first fluid connection coupled to a manifold header of the subsea manifold; a second fluid connection coupled to a cavity associated with the subsea manifold; and a unidirectional gate valve disposed between the first fluid connection and the second fluid connection, the unidirectional gate valve configurable between an open position in which fluid is permitted to flow freely between the manifold header and the cavity and a closed position in which fluid is prevented from flowing to the cavity, wherein the unidirectional gate valve is configured to permit fluid leakage from the cavity to the manifold header in the closed position to thereby reduce a pressure associated with the cavity. Thus, the illustrative embodiment provides technological improvements over conventional techniques by implementing a unidirectional gate valve configurable to permit fluid leakage providing more efficient mechanisms for relieving the pressure within the cavity of a manifold.

Clause 2. The overpressure assembly of clause 1, wherein the unidirectional gate valve comprises: a gate; a first valve seat disposed between the gate and the first fluid connection; and a second valve seat disposed between the gate and the second fluid connection.

Clause 3. The overpressure assembly of any of clause 1 or clause 2, wherein the first valve seat comprises a leakage opening that permits fluid leakage from the cavity to the manifold header.

Clause 4. The overpressure assembly of any of clause 1 through clause 3, wherein the unidirectional gate valve comprises a check valve disposed within a gate of the unidirectional gate valve.

Clause 5. The overpressure assembly of any of clause 1 through clause 4, further comprising: one or more sensors disposed within the first fluid connection, the one or more sensors configured to detect at least one parameter of the subsea manifold.

Clause 6. The overpressure assembly of any of clause 1 through clause 5, wherein the one or more sensors comprises a temperature sensor configured to detect a temperature of the subsea manifold.

Clause 7. The overpressure assembly of any of clause 1 through clause 6, wherein the unidirectional gate valve is configured to automatically close based at least in part on the temperature of the subsea manifold.

Clause 8. A block manifold assembly comprising: a manifold header comprising a header bore; a plurality of branch connections selectively fluidly connected to the header bore; a plurality of valves disposed respectively at the plurality of branch connections, wherein at least one of the plurality of valves comprises a unidirectional gate valve, the unidirectional gate valve comprising: a gate configurable between a closed position and an open position; a first valve seat disposed between the gate and the manifold header, the first valve seat comprising: a leakage opening that permits fluid leakage from a cavity associated with the respective branch connection to the manifold header when the gate is in the closed position; and a second valve seat disposed between the gate and the respective branch connection, wherein the second valve seat seals against the gate when the gate is in the closed position. Thus, the illustrative embodiment provides technological improvements over conventional techniques by implementing a block manifold assembly with a unidirectional gate valve configurable to permit fluid leakage providing more efficient mechanisms for relieving the pressure within the cavity of the block manifold.

Clause 9. The block manifold assembly of clause 8, wherein the plurality of valves further comprises one or more bidirectional gate valves.

Clause 10. The block manifold assembly of clause 8 or clause 9, further comprising: a cap disposed on an end of at least one of the branch connections, the cap comprising a crushed gasket configured to seal the cavity of the respective branch connection.

Clause 11. The block manifold assembly of any of clause 8 through clause 10, wherein the cap comprises a metal-to-metal contact interface configured to provide a pressure seal to the cavity.

Clause 12. The block manifold assembly of any of clause 8 through clause 11, further comprising: an external valve disposed on an end of at least one branch connection of the plurality of branch connections, the external valve configured to selectively close the cavity of the at least one branch connection.

Clause 13. The block manifold assembly of any of clause 8 through clause 12, wherein the block manifold assembly is machined from a rigid metal material.

Clause 14. The block manifold assembly of any of clause 8 through clause 13, further comprising: a plurality of fastener holes disposed within a portion of the block manifold assembly, each fastener hole of the plurality of fastener holes configured to receive a fastener to thereby connect the portion of the block manifold assembly to a branch tube.

Clause 15. A unidirectional gate valve assembly for a subsea manifold, the unidirectional gate valve assembly comprising: a gate configurable between a closed position and an open position; a first valve seat disposed between the gate and a connection to a manifold header of the subsea manifold, wherein the first valve seat comprises at least one leakage opening that permits fluid leakage from a cavity associated with a branch connection to the manifold header when the gate is in the closed position; and a second valve seat disposed between the gate and the branch connection, wherein the second valve seat seals against the gate when the gate is in the closed position. Thus, the illustrative embodiment provides technological improvements over conventional techniques by implementing a unidirectional gate valve configurable to permit fluid leakage providing more efficient mechanisms for relieving the pressure within the cavity of a manifold.

Clause 16. The unidirectional gate valve assembly of clause 15, wherein the unidirectional gate valve assembly is configured to be placed within a valve opening of a block manifold proximate to a branch connection to a header bore of the block manifold.

Clause 17. The unidirectional gate valve assembly of clause 16 or clause 17, further comprising: a gate opening disposed within a portion of the gate, the gate opening configured to allow fluid to pass through the gate when in the open position.

Clause 18. The unidirectional gate valve assembly of any of clause 15 through clause 17, further comprising: one or more temperature sensors configured to detect a temperature associated with the subsea manifold.

Clause 19. The unidirectional gate valve assembly of any of clause 15 through clause 18, wherein a thermal expansion is estimated based on the temperature detected by the one or more temperature sensor.

Clause 20. The unidirectional gate valve assembly of any of clause 15 through clause 19, wherein the unidirectional gate valve assembly is configured to interface with one of a block manifold or a pipe manifold.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. An overpressure assembly for a subsea manifold, the overpressure assembly comprising:
a first fluid connection coupled to a manifold header of the subsea manifold;
a second fluid connection coupled to a cavity associated with the subsea manifold; and
a unidirectional gate valve disposed between the first fluid connection and the second fluid connection, the unidirectional gate valve configurable between an open position in which fluid is permitted to flow freely between the manifold header and the cavity and a closed position in which fluid is prevented from flowing to the cavity,
the unidirectional gate valve comprising:
a gate;
a first valve seat disposed between the gate and the manifold header, the first valve seat comprising:
a leakage opening that permits fluid leakage from the cavity to the manifold header when the gate is in the closed position; and
a second valve seat disposed between the gate and the cavity, wherein the second valve seat seals against the gate when the gate is in the closed position.

2. The overpressure assembly of claim 1, wherein the first valve seat comprises a leakage opening that permits fluid leakage from the cavity to the manifold header.

3. The overpressure assembly of claim 1, wherein the unidirectional gate valve comprises a check valve disposed within a gate of the unidirectional gate valve.

4. The overpressure assembly of claim 3, further comprising:
one or more sensors disposed within the first fluid connection, the one or more sensors configured to detect at least one parameter of the subsea manifold.

5. The overpressure assembly of claim 4, wherein the one or more sensors comprises a temperature sensor configured to detect a temperature of the subsea manifold.

6. The overpressure assembly of claim 5, wherein the unidirectional gate valve is configured to automatically close based at least in part on the temperature of the subsea manifold.

7. A block manifold assembly comprising:
a manifold header comprising a header bore;
a plurality of branch connections selectively fluidly connected to the header bore; and
a plurality of valves disposed respectively at the plurality of branch connections, wherein at least one of the plurality of valves comprises a unidirectional gate valve, the unidirectional gate valve comprising:
a gate configurable between a closed position and an open position;
a first valve seat disposed between the gate and the manifold header, the first valve seat comprising:
a leakage opening that permits fluid leakage from a cavity associated with the respective branch connection to the manifold header when the gate is in the closed position; and
a second valve seat disposed between the gate and the respective branch connection, wherein the second valve seat seals against the gate when the gate is in the closed position.

8. The block manifold assembly of claim 7, wherein the plurality of valves further comprises one or more bidirectional gate valves.

9. The block manifold assembly of claim 7, further comprising:
a cap disposed on an end of the respective branch connection, the cap comprising a crushed gasket configured to seal the cavity of the respective branch connection.

10. The block manifold assembly of claim 9, wherein the cap comprises a metal-to-metal contact interface configured to provide a pressure seal to the cavity.

11. The block manifold assembly of claim 7, further comprising:
an external valve disposed on an end of at least one branch connection of the plurality of branch connections, the external valve configured to selectively close the cavity of the at least one branch connection.

12. The block manifold assembly of claim 7, wherein the block manifold assembly is machined from a rigid metal material.

13. The block manifold assembly of claim 12, further comprising:
a plurality of fastener holes disposed within a portion of the block manifold assembly, each fastener hole of the plurality of fastener holes configured to receive a fastener to thereby connect the portion of the block manifold assembly to a branch tube.

14. A unidirectional gate valve assembly for a subsea manifold, the unidirectional gate valve assembly comprising:
a gate configurable between a closed position and an open position;
a manifold connection fluidly coupled to a manifold header of the subsea manifold;
a branch connection fluidly coupled to a cavity comprising a trapped volume of fluid;
a first valve seat disposed between the gate and the manifold connection,
wherein the first valve seat comprises at least one leakage opening that permits fluid leakage from the cavity to the manifold header when the gate is in the closed position; and
a second valve seat disposed between the gate and the branch connection, wherein the second valve seat seals against the gate when the gate is in the closed position.

15. The unidirectional gate valve assembly of claim 14, wherein the unidirectional gate valve assembly is configured to be placed within a valve opening of a block manifold proximate to the branch connection and a header bore of the block manifold.

16. The unidirectional gate valve assembly of claim 15, further comprising:
a gate opening disposed within a portion of the gate, the gate opening configured to allow fluid to pass through the gate when in the open position.

17. The unidirectional gate valve assembly of claim 14, further comprising:
one or more temperature sensors configured to detect a temperature associated with the subsea manifold.

18. The unidirectional gate valve assembly of claim 17, wherein a thermal expansion is estimated based on the temperature detected by the one or more temperature sensors.

19. The unidirectional gate valve assembly of claim 14, wherein the unidirectional gate valve assembly is configured to interface with one of a block manifold or a pipe manifold.

* * * * *